March 20, 1962 R. S. ENGLANDER 3,026,383

AUTOMATIC MONITORING DEVICE FOR COMMUNICATION LINES

Filed Feb. 4, 1959 2 Sheets-Sheet 1

INVENTOR.
ROBERT S. ENGLANDER

BY James and Franklin

ATTORNEYS

March 20, 1962 R. S. ENGLANDER 3,026,383

AUTOMATIC MONITORING DEVICE FOR COMMUNICATION LINES

Filed Feb. 4, 1959 2 Sheets-Sheet 2

INVENTOR.
ROBERT S. ENGLANDER

BY James and Franklin

ATTORNEYS

United States Patent Office 3,026,383

Patented Mar. 20, 1962

3,026,383

AUTOMATIC MONITORING DEVICE FOR COMMUNICATION LINES

Robert S. Englander, 7 W. 46th St., New York, N.Y.

Filed Feb. 4, 1959, Ser. No. 791,060

25 Claims. (Cl. 179—175.2)

Figure 1:
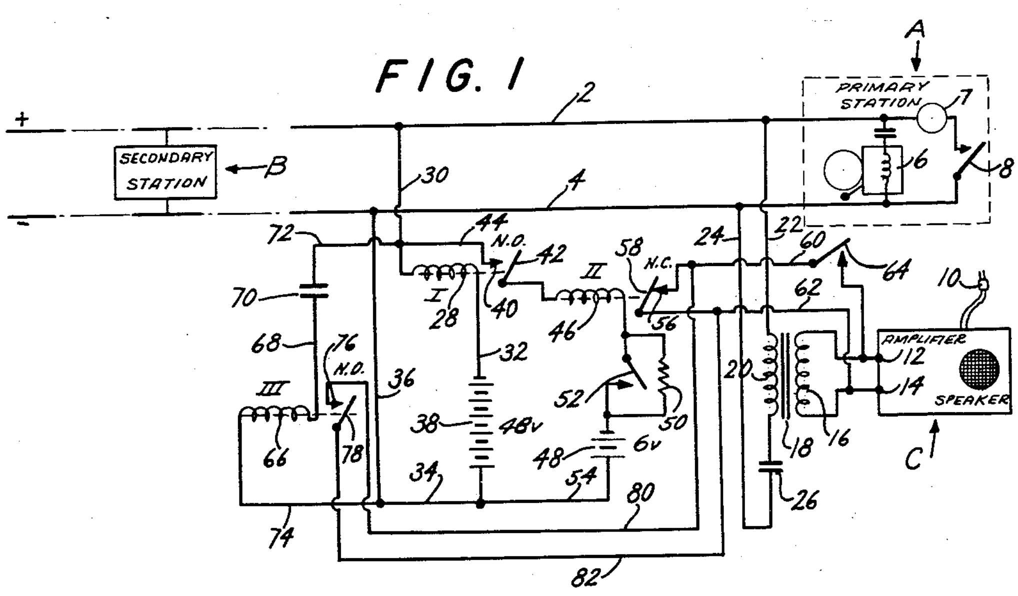

The present invention relates to a device for monitoring a communication line such as a telephone line and to means for controlling said monitoring device in accordance with the manner in which said line is being used.

There are many occasions when it is desired to monitor the activity of a communication line. One way of doing so is to connect a transducing device, such as an amplifier-loudspeaker combination or a recorder, to the line and keep that transducing device energized at all times. Then recordation or reproduction of all communication will occur. This system is subject, however, to several drawbacks which militate strongly against its use in casual or business situations, and which leave it susceptible to practical use only in situations of extreme surveillance or espionage. In the first place, since the transducing device is always energized a great deal of useless recordation or reproduction occurs, and if loudspeaker reproduction is involved there is a constant stream of noise emanating from the loudspeaker, particularly when the line is not in use. Secondly, the person for whose benefit the monitor is functioning cannot himself use the communication line in privacy, since the transducer will be effective for his conversations as well.

Systems have been devised in which automatic control of the transducer is effected in response to predetermined occurrences on the transmission line. Thus, for automatic answering, message-giving and message-taking apparatus the ringing signal at a given station on a telephone line has been employed to set the transducer into operation. For purposes of surveillance the action of a particular party in lifting the telephone from its hook has been used to cause a recording or reproducing apparatus to be rendered operative, the replacement of the telephone on the hook causing de-energization of the transducer.

The system of the present invention is designed to be used specifically in connection with a communication line, such as a telephone line, having at least two answering stations. The station where monitoring is to take place is here designated the "primary station" while the other answering station is designated the "secondary station." The system is designed to permit a person at the primary station to hear everything which transpires on the line when the secondary station is connected to the line and when the primary station proper is disconnected from the line. Moreover, when the primary station comes onto the line means are provided for automatically de-actuating the transducer, either as soon as the primary station comes on the line or as soon as the secondary station goes off the line after the primary station has come on the line. In this way monitoring of all communications with the secondary station is effected automatically, the transducer being operative only while such communication takes place, yet when the primary station comes on the line communication with the primary station is private insofar as the transducing device is concerned and, if desired, the operativeness or inoperativeness of the transducing device can indicate whether the secondary station is connected to or disconnected from the line.

There are many situations in which this type of monitoring is desirable. An executive having several subordinates at extension stations on a given telephone line may wish to be aware of all communications which those subordinates may have, but without requiring any action on his part, such as picking up his telephone to listen in. Such an executive would not, of course, wish a conversation which he was having to be amplified and transmitted throughout his room.

Many busy individuals utilize answering services for the purpose of taking calls and messages. Such individuals periodically obtain their messages from the answering service and then call back those people to whom they wish to speak. This type of screening involves a considerable time delay in completing the conversations that are desired. With the present invention this time delay can be completely eliminated. The subscriber to the answering service can, in accordance with the present invention, utilize an amplifier-loudspeaker transducer which will be rendered operative whenever the answering service (at the secondary answering station) answers the phone. The subscriber will hear who is calling and, if he desires to speak to that person, all he need do is pick up the phone, whereupon the answering service, hearing him on the line, will hang up. If desired, the status of the transducer can itself indicate to the subscriber whether the answering service is listening in, the system then being set up so that the transducer is inoperative only when the subscriber (the primary answering station) is on the line and the secondary answering station is off the line. This will greatly expand the utility of answering services, since they may, when the present invention is employed, be utilized in lieu of a secretary and at a much lesser cost than a secretary.

These results are accomplished by utilizing a control and actuating means for the transducer which is sensitive to the electrical conditions of the communication line. By way of example, the nominal voltage across a conventional telephone line when neither the primary nor secondary answering stations are on the line has a certain nominal value, which in some typical systems is 48 volts and in other typical systems is 24 volts. When a particular station is called a ringing signal is received at the primary station and at the secondary station (answering service). When the answering service comes on the line the line voltage at the primary station will drop to a lower value, usually somewhere between 12 and 20 volts. When the primary station comes on the line the line voltage at the primary station will drop to 4 or 5 volts and a current will flow through the telephone handset at the primary station. When the secondary station gets off the line while the primary station remains on the line, the voltage at the primary station will rise to a somewhat higher value, around 6 or 7 volts, and the current through the handset of the primary station will rise. The actuating and control means can be rendered sensitive to these changes in the electrical condition of the line, or to some of them, in order to control the transducer in accordance therewith.

Thus a relay system can be employed which is sensitive to line voltage, which will de-actuate the transducer when the voltage of the primary station is at its nominal value, which will render the transducer operative when the line voltage is at its intermediate value of 12 to 20 volts, and which will render the transducer inoperative when the line voltage falls to the neighborhood of 6 volts or when a current of predetermined magnitude passes through the instrument at the primary station. The relay system can be made sufficiently sensitive to keep the transducer operative when the voltage across the line at the primary station is at its lowest value or when the current through the instrument at the primary station is at a comparatively low value, corresponding to the presence on the line of both the primary and secondary stations, but to render the transducer inoperative when the line voltage at the primary station is 6 volts or when the current through the primary station instrument is at a higher value, corresponding to the presence on the line only of the primary station, in this way indicating to the monitoring individual the presence or absence of the answering service on the line.

A significant point to be borne in mind is that the transducer is rendered operative automatically, and without requiring any action on the part of the monitoring individual at the primary station, whenever the secondary station comes on the line, thus permitting the monitoring individual to carry on his normal activities and permitting monitoring whether that individual is close to his phone or not.

Since the ringing signal is received at the primary station in normal manner, and since the transducer is actuated as soon as the answering service comes on the line, use of the system of the present invention permits an answering service subscriber to monitor the promptness, politeness and efficiency of the answering service.

Although it is believed that the use of an amplifier loudspeaker combination in the system of the present invention is most desirable, the transducer could take other forms, such as a wire or tape recorder. Indeed, it is not, strictly speaking, necessary that a transducer be employed, since there may be many applications where other intelligence-giving devices could be employed.

An important desideratum in devices of this type is that they be useable without effecting to any appreciable or measurable degree the normal operation of the communication line. In particular it is desirable that such devices draw little or no current from the line. It is also desirable, particularly when the devices of the present invention are battery-powered, that they draw as little power as possible from the batteries during such time as the device is in stand-by condition awaiting the connection of the secondary answering station to the line. Various embodiments of the instant invention are described below which meet these criteria in varying degrees.

While the transducer is operative it is desirable that certain line noises, such as those associated with dialing, should not be amplified or reproduced. This is readily accomplished by means of simple circuitry.

To the accomplishment of the above, and to such other objects as may hereinafter appear, the present invention relates to an automatic monitor for a communication line as defined in the appended claims and as described in this specification, taken together with the accompanying drawings, in which:

FIGS. 1, 2, 3, 4 and 5 are circuit diagrams of alternative embodiments of the present invention.

FIG. 1 illustrates a system which is entirely in shunt across the communication lines 2 and 4, which draws substantially no current either from the lines 2 and 4 or from its self-contained voltage sources when in stand-by condition, and which, at the option of the user, permits selective operation of the device to deenergize the transducer either when the primary station comes on the line, irrespective of the condition of the secondary station, or when the primary station is on the line and the secondary station is simultaneously off the line. The primary station is generally designated A and comprises, as is conventional, a ringing bell 6 and a normally disconnected instrument (schematically shown in the drawings and generally designated 7) the switch of which is designated 8. The secondary station, which may be at an answering service or which may be an extension on the line 2, 4, is generally designated B. The transducer, here disclosed as an amplifier-loudspeaker combination, is generally designated C and is provided with a plug 10 adapted to be connected to any suitable source of power for energizing the amplifier. The amplifier input terminals 12 and 14 are connected to the secondary 16 of a transformer 18 the primary 20 of which is connected across the lines 2, 4 by means of leads 22 and 24, a capacitor 26 being in series with the primary winding 20.

The actuating and control means for the transducer C comprises the relays designated I, II and III. The actuating coil 28 of relay I is connected across the lines 2, 4 by means of leads 30, 32, 34 and 36, and is in series with a battery 38 having a voltage corresponding to the nominal voltage across the lines 2, 4 when the lines are not being used, e.g. 48 volts. The relay I is provided with a pair of normally open contacts 40 and 42, the former being connected to line 2 by leads 44 and 30 and the latter being connected to the actuating coil 46 of relay II, that coil 46 being connected to a 6-volt battery 48 via resistor 50 and manually actuatable resistor-shorting switch 52, the other end of the battery 48 being connected to the line 4 by means of leads 54, 34 and 36. The relay II is provided with a pair of normally closed contacts 56 and 58 connected respectively, via leads 60 and 62, to the amplifier input terminals 12 and 14, a manually actuatable switch 64 being interposed in the line 60. If desired to mute dial tone noises and the like, the relay III may be provided having an actuating coil 66 connected to line 2 via lead 68, capacitor 70 and leads 72 and 30 and connected at its other end to line 4 via leads 74 and 36. The normally open contacts 76 and 78 of relay III are connected to the leads 60 and 62 respectively via leads 80 and 82 respectively.

When it is desired to place the device of FIG. 1 into operation the plug 10 of the transducer C is connected to any suitable source of external power and the switch 64 is closed. Under normal circumstances, when the line is unused (when neither the primary station A nor the secondary station B are on the line) the line voltage will be equal and opposite to the voltage of the battery 38, no current will flow through the coil 28 of relay I, the circuit through the coil 46 of relay II will be interrupted, the contacts 56 and 58 of relay II will be engaged, the input to the transducer C will be shorted, and consequently there will be no audible output therefrom.

When the primary station A is called, a ringing signal will be transmitted over lines 2 and 4, actuating the ringer 6 at the primary station A and the ringer at the secondary station B. When the secondary station B comes on the line to answer the call (or if the secondary station B should come on the line to initiate a call) the voltage across the lines 2, 4 will drop to some lower value, usually about 15 volts but sometimes varying between 12 and 20 volts. Since this voltage will now be appreciably less than the 45 volts of battery 38, a current will flow through the coil 28 of relay I, the contacts 40 and 42 will be engaged, and a circuit will thus be completed through the coil 46 of relay II. Since the voltage across the lines 2, 4 is considerably in excess of the 6 volts produced by the battery 48, a current will flow through the coil 46, the contacts 56 and 58 will be disengaged, the input to the transducer C will no longer be shorted, and consequently the transducer C will detect, amplify and reproduce all of the sounds transmitted on the lines 2, 4, thus permitting the individual at the monitoring station to hear all that transpires between the secondary station B and any other station on the line (e.g. the calling station).

If the monitoring individual desires to come on the line he will pick up the phone at the primary station A, thus closing the switch 8. As a result the voltage across the lines 2, 4 will drop to something on the order of 6 volts. This line voltage will be substantially equal to the voltage of the battery 48, current through the coil 46 of the relay II will be reduced to a value insufficient to actuate the relay II, the contacts 5 and 58 will again engage, the input at the transducer C will be shorted, and the transducer C will become inoperative. The individual at the primary station can then carry on a conversation over the lines 2, 4 in privacy, and without having that conversation transduced.

In some instances the monitoring individual will want to know whether the secondary station B is still on the line. The system can be devised to indicate whether the secondary station B is on the line through the status of the transducer C. When both stations A and B are on the line the voltage across the lines 2, 4 may be 4 or 5 volts, whereas when only the primary station A is on the line the voltage across the lines 2, 4 may be at a somewhat higher value, 6 or 7 volts. By using a sufficiently sensitive relay II, this difference in voltage can be detected and put to work. When the line voltage is below 6 volts (4 or 5 volts) a current will flow through the winding 46 of relay II. If the magnitude of that current is sufficient to actuate the relay and separate the contacts 56 and 58, then the transducer C will remain operative until such time as the secondary station B gets off the line, the line voltage then rising to approximately 6 volts so that there is substantially no current flowing through the winding 46. The purpose of the resistor 50 and shorting switch 52 is to permit the monitoring individual to select the type of operation which he desires when a relay II of sufficient sensitivity for this purpose is employed. With the switch 52 closed the voltage differential between the line and the battery 48 when both stations A and B are on the line will be sufficient to actuate the relay II. When the switch 52 is opened the resistance 50 is effectively placed in the circuit, the amount of current produced by that voltage difference will be decreased to a value insufficient to actuate the relay II, and consequently the sensitive relay II will become de-actuated when the primary station A comes on the line independently of whether the second station B is on the line or not.

By using a capacitor 70 of appropriate value the winding 66 of relay III will be energized only when signals of a predetermined frequency, such as those associated with dial tones, dialing clicks or the like, are present. Actuation of the relay III causes engagement of contacts 76 and 78, thus shorting the input to the transducer C and preventing any output therefrom. As soon as these noise signals disappear the relay III becomes de-energized and relays I and II control as before.

The system of FIG. 1 has the advantage that it does not require any connection in series with the lines 2, 4 and draws substantially no current except when the secondary station B is on the line.

Figure 2:
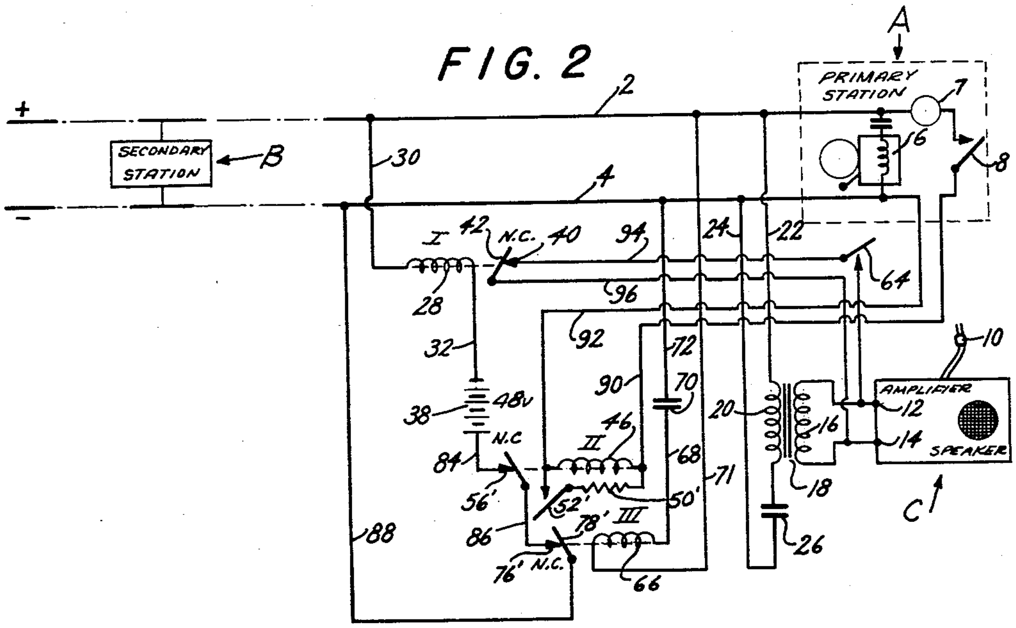

The embodiment of FIG. 2 is essentially similar to that of FIG. 1, and differs therefrom primarily in the manner in which the relays are interconnected, which manner could optionally be employed in the embodiment of FIG. 1, and in the fact that the de-energization of the transducer C is effected by sensing the current in the lines 2, 4 rather than the voltage thereof. To these ends the transducer C is connected across the lines 2, 4 in substantially the same manner as in FIG. 1. The actuating coil 28 of relay I is connected to line 2 by means of lead 30 and to 45-volt battery 38 by means of lead 32.

The other end of the battery 38 is connected by lead 84 to contact 56′ of relay II, the contact 58′ thereof being connected by lead 86 to contact 76′ of relay III, the contact 78 thereof being connected by lead 88 to line 4. The actuating winding 46 of relay II is connected directly into the line 4 adjacent the telephone instrument at the primary station A by means of leads 90 and 92. The resistor 50′ is connected across the winding 46 in series with manually actuatable switch 52′. The contacts 40 and 42 of relay I are connected, by means of leads 94 and 96, to the transducer input terminals 12 and 14. The contacts of all three of the relays are normally closed.

The actuating winding 66 of relay III is connected to the lines 2, 4 by means of lead 68, capacitor 70 and lead 72 and by means of lead 74.

With this system, so long as the primary station A is off the line the switch 8 is opened and the winding 46 of relay II is deenergized. So long as the secondary station B is off the line the winding 28 of relay I is not energized and the input to the transducer C is shorted. When the secondary station B comes on the line the winding 28 of relay I becomes energized, the contacts 40 and 42 operate, and, provided the manual switch 64 is closed, the transducer C is rendered operative. When the primary station A comes on the line, the switch 8 closes, the winding 46 of relay II becomes energized, the contacts 56′ and 58′ separate, the circuit through the winding 28 of relay I is broken, relay I de-energizes, the contacts 40 and 42 engage one another, the transducer input is shorted, and the transducer is rendered inoperative. If it is desired that the transducer C be rendered inoperative as soon as the primary station A comes on the line, and irrespective of whether the secondary station B is on the line or not, then the switch 52′ is opened. In that case all of the current in the line 4 passes through the coil 46 of relay II, and this is sufficient to actuate relay II even when that line current is at a low value, as it would be while the secondary station B is on the line with the primary station A. If it is desired that the transducer C be rendered inoperative only after the secondary station B is off the line, then the switch 52′ is closed. The current in the line 4 will then divide between the winding 46 and the resistor 50′, and when that current is at its low value corresponding to the presence on the line of both stations A and B, the amount of current in the winding 46 will be insufficient to actuate the relay II. However, when the secondary station B gets off the line the line current at the primary station A increases sufficiently so that the portion of the line current passing through the coil 46 is adequate to energize the relay II. The relay III in this embodiment functions in the same manner as in the embodiment of FIG. 1 except that actuation thereof interrupts the circuit to the coil 28 of relay I, thus causing shorting of the transducer input indirectly, rather than directly as in FIG. 1.

Figures 3, 4, 5:
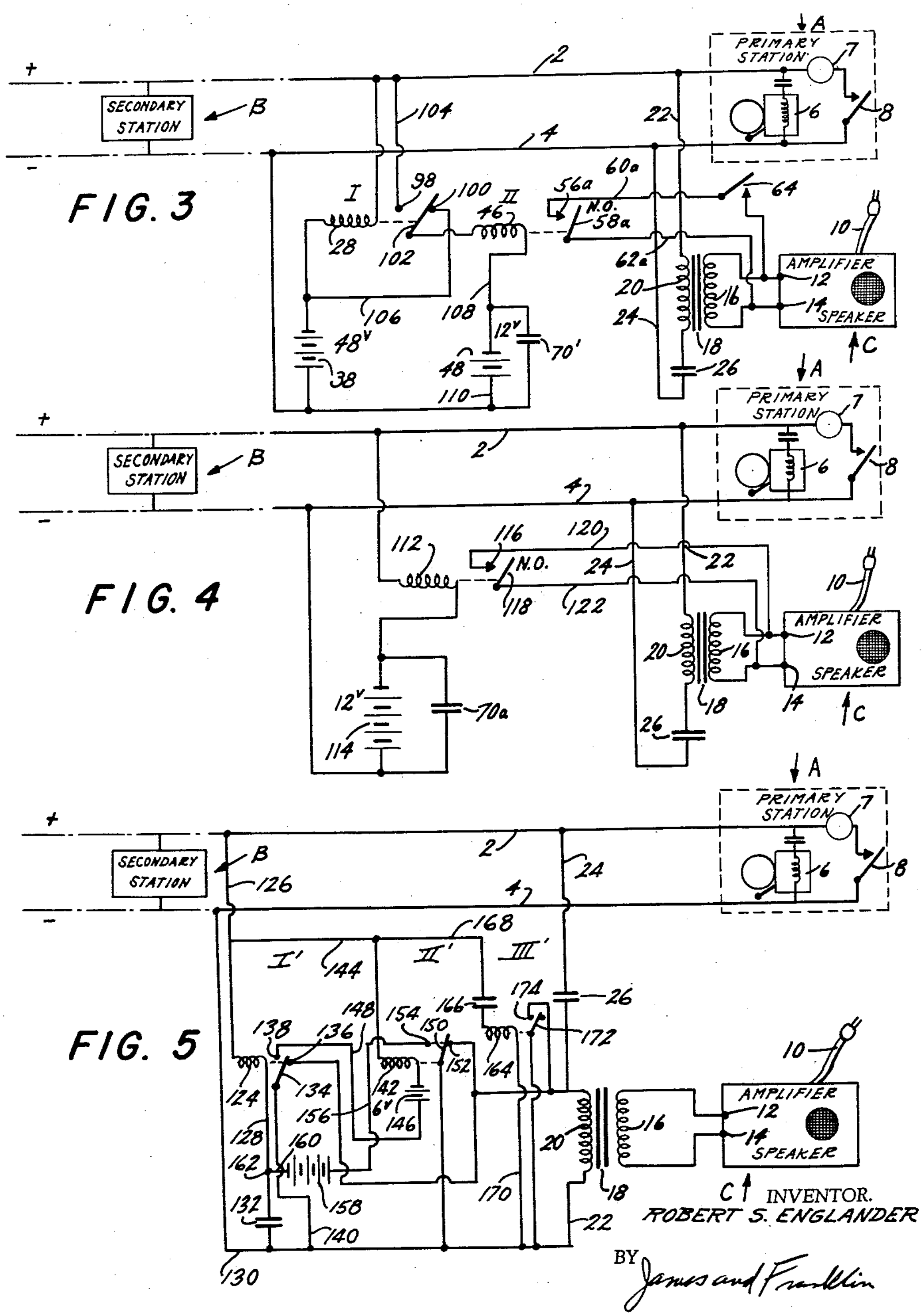

The embodiment of FIG. 3 is similar to that of FIG. 1 in that it is connected across and not in the lines 2, 4. It has the advantage that it utilizes two relays to do the work of the three relays of FIG. 1. It has the disadvantage that it draws some current from its own batteries while in stand-by condition, although its drain on the line current is insignificant. In this embodiment the transducer C is connected across the lines 2 and 4 as in the preceding embodiments. The winding 28 on relay I is connected across the lines 2 and 4 in series with bucking 48-volt battery 38. It is provided with two fixed contacts 98 and 100 and a movable contact 102 normally engaged with contact 100 but movable away therefrom and into engagement with contact 98 when the winding 28 is appropriately energized. The contact 98 is connected to line 2 via lead 104. The contact 100 is connected to the negative terminal of the 48-volt battery 38 by lead 106. The movable contact 102 is connected to the coil 46 of relay II, the other end of the coil being connected to line 4 via lead 108, 12-volt battery 48 and lead 110. Capacitor 70′ is connected across the 6-volt battery 48. The relay II is provided with normally open contacts **56*a* and 58*a* connected by leads 60*a* and 62*a* to the transducer input terminals 12 and 14** respectively.

In this embodiment when neither station A nor B is on the line the winding 28 of relay I is de-energized. Contacts 100 and 102 connect winding 46 of relay II in a loop including the bucking batteries 38 and 48. Since the battery 38 has a greater voltage than the battery 48 the winding 46 will be energized, the contacts **56*a* and 58*a* will be engaged, and the input to the transducer C will be shorted. When either station A or B or both are on the line the winding 28 of relay I will be energized, contacts 98 and 102 will be engaged, and the winding 46 of relay II will be across the line. When only the secondary station B is on the line the line voltage will equal that of the battery 48 (a nominal figure of 12 volts being here posited, it being understood that the battery 48 will be selected to have a voltage properly corresponding to that across the lines 2, 4 when only the secondary station B is on the line), the winding 46 of relay II will be de-energized, the contacts 56a and 58a will separate, and the transducer C will be rendered operative. When the primary station A comes on the line the line voltage will fall below 12 volts, a current will flow through the winding 46 of relay II, the contacts 56a and 58a will engage, and the input to the transducer C will be shorted. So long as relay I is energized and even if winding 46 of relay II is normally de-energized, thus rendering the transducer C inoperative, line signals corresponding to dial clicks or the like will be passed by capacitor 70', thus energizing the winding 56** of relay II and shorting the transducer input for so long as such noises continue.

The embodiment of FIG. 4 has the advantage that only a single relay is employed. It has the disadvantage that it draws line current while in stand-by condition. In this embodiment the actuating winding 112 of the single relay is connected across the lines 2 and 4 in series with a 12-volt battery 14, and condenser 70a is connected across the battery 114. The normally open contacts 116 and 118 of the relay are connected via leads 120 and 122 respectively to the transducing input terminals 12 and 14. Here, as in the embodiment of FIG. 3, the value of 12 volts for the battery 114 is selected as nominally corresponding with the line voltage when the secondary station B alone is on the line, and if in a given installation that voltage should vary from the nominal 12-volt value then the actual value selected for the battery 114 will be correspondingly altered. In this embodiment when neither station A nor B are on the line the coil 112 will be energized, the contacts 116 and 118 will engage, and the input to the transducer C will be shorted. When the secondary station B is on the line the line voltage will be equal and opposite to the voltage of the battery 114, the coil 112 will be de-energized, the contacts 116 and 118 will separate, and the transducer C will be rendered operative. When the primary station A comes on the line the line voltage will drop to approximately 6 volts, the winding 112 will again be energized, the contacts 116 and 118 will be engaged, and the transducer input will be shorted.

The embodiment of FIG. 5 differs from the preceding embodiments in several significant respects. When in stand-by condition there is a truly minimal load across the line which has no detectable effect on the functioning of the line. The system is, moreover, insensitive to variation in line voltage except those which occur during the time that the telephone is actually being used, this by reason of the fact that means are provided for setting the controls into operation only upon the occurrence of some abnormal signal in the line, such as a ringing signal or the "click" which would be produced when the secondary station comes on the line. Moreover, there is no drain on the batteries of the control circuit except when the control system is set into operation by the detection of the ringing or comparable signal.

In this system the transducer C is connected to the lines 2 and 4 as in the previous embodiments (it being understood that the use of the transformer 18 is desirable but not essential in all of the illustrated embodiments), the embodiment of FIG. 5 differing in that the control of the amplifier input is effectuated at the primary winding 20 rather than at the secondary winding 16 of the transformer 18. For control purposes relays I', II' and III' are used. The control winding 124 of the relay I' is connected across the lines 2 and 4 by means of leads 126, 128 and 130 in series with capacitor 132. The armature 134 of the relay I' normally engages contact 136 but is moved away therefrom and into engagement with the contact 138 when the winding 124 is appropriately energized. The armature 134 is connected by means of lead 140 to the lead 130. The energizing winding 142 of relay II' is connected to line 2 via leads 144 and 126 and its other end is connected to the negative terminal of six-volt battery 146, the positive terminal of which is connected by lead 148 to contact 138 of relay I'. The armature 150 of relay II' normally engages contact 152 and moves out of engagement therefrom and into engagement with contact 154 when the winding 142 is appropriately energized. The contact 154 is connected via lead 156 to the positive terminal of 45-volt battery 158, the negative terminal of which is connected by lead 160 to point 162 on lead 128, that point being between the condenser 132 and the line 2. The actuating winding 164 of relay III' is connected via capacitor 166 and lead 168 to lead 144, its other end being connected by lead 170 to lead 130. The armature 172 of relay III' is normally open with respect to contact 174 thereof but moves into engagement with contact 174 when the winding 164 is appropriately energized. Contacts 136 of relay I', 152 of relay II' and 174 of relay III' are all connected to the upper end of the primary winding 20 of transformer 18, while the armatures 136, 150 and 172 of all three relays are connected to lead 130.

The operation of the system of FIG. 5 is as follows: Normally all of the relays are in the condition shown. D.C. circuits through the batteries 146 and 158 are both open, so there is no battery drain. The input to the amplifier is shorted by relays I' and II'. When there is a ringing signal or any other type of rapidly changing signal on the lines 2 and 4 which is of sufficient magnitude, the relay winding 124 will be energized. This will place the winding 142 of relay II' across the line, that circuit being traced from line 2 through leads 126 and 144, through the winding 142 and the battery 146, and then, via lead 148 contact 138, armature 134 and leads 140 and 130 to the other line 4. If the line voltage is appreciably different from six volts (which will be the case unless the primary station has answered), the winding 142 will be energized. This will in turn place the winding 124 of relay I' across the line in series with the 45-volt battery 158, that circuit being traceable from line 2 via lead 126 to winding 124, and then, via lead 128, point 162, and lead 160 to the 45-volt battery 158, and then via lead 156, contact 154 and armature 150 and lead 130 to the other line 4. If no one answers the line voltage will remain at 45 volts, thus balancing the battery 158, and relay I will open as soon as the ringing signal disappears or as long thereafter as it takes for the charge to leak off from the condenser 132. This will open the circuit to the winding 142 of relay II', and that relay will also open. On the other hand, if the secondary station is on the line the line voltage will be appreciably less than 45 volts, winding 124 will be effectively energized, armature 134 will remain engaged with the contact 138, and armature 150 will remain engaged with contact 154. Since this necessarily involves separation of armature 134 from contact 136 and armature 150 from contact 152, the input to the transducer C will no longer be shorted, and the transducer will function. When the primary station comes on the line the line voltage will drop to 6 volts, winding 142 will no longer be effectively energized, armature 150 will again engage contact 152, shorting the input to the transformer C, the D.C. circuit to the winding 124 of relay I' will be broken, and the armature 134 thereof will again engage with contact 136. Relay III' is used for muting purposes to prevent ringing signals or dial clicks from being amplified by the transducer C. Such signals will effectively energize winding 164, causing armature 172 to engage contact 174 and short the input to the transducer C. This will occur during a ringing signal independently of the actions of the relays I' and II', thus effectively preventing transducing of the ringing signal.

It will be apparent from the above that the devices of the present invention are simple, inexpensive, capable of being made of standard and pre-existing circuit components, and require no particular degree of precision. Operation is reliable and effective. Results are obtained which, insofar as applicant is aware, have never been obtained before. Most significantly, the devices of the present invention may be manufactured and sold as packaged units capable of being used without substantial modification in practically all telephone lines or other communication lines. They may be connected thereto simply and without difficulty and, except in the case of the embodiment of FIG. 2, without having to interrupt or break into the existing communicating lines. They do not, with the possible exception of the embodiment of FIG. 4, draw any appreciable current from the communication line, and none of them appreciably affect the dynamic characteristics of such lines nor in any way deleteriously affect the proper functioning thereof.

While but a limited number of specific embodiments of the present invention have been disclosed, it will be apparent that many variations may be made therein, and that specific arrangements disclosed in any one of the illustrated embodiments could be incorporated into the others through suitable modification thereof, all within the spirit of the invention as defined in the following claims.

I claim:

1. An automatic monitor for a communication line comprising a transducing device connected to said line and actuatable between operative and inoperative conditions, and actuating means operatively connected between said line and said device, sensitive to a D.C. electrical condition of said line, effective to actuate said device to one of said conditions when said D.C. electrical condition departs from a nominal value by a first amount, and effective to actuate said device to the other of said conditions when said D.C. electrical condition departs from said nominal value by a second amount greater than said first amount.

2. An automatic monitor for a communication line comprising a transducing device connected to said line and actuatable between operative and inoperative conditions, and actuating means operatively connected between said line and said device, sensitive to the voltage of said line, effective to actuate said device to one of said conditions when said voltage departs from a nominal value by a first amount, and effective to actuate said device to the other of said conditions when said voltage departs from said nominal value by a second amount greater than said first amount.

3. An automatic monitor for a communication line comprising a transducing device connected to said line and actuatable between operative and inoperative conditions, and actuating means operatively connected between said line and said device, sensitive to the D.C. voltage and direct current of said line, effective to actuate said device to one of said conditions when said D.C. voltage departs from a nominal value by a first amount, and effective to actuate said device to the other of said conditions when said direct current in said line is in a predetermined range of values.

4. The automatic monitor of claim 1, in which said actuating means is ineffective to actuate said device to said other of said conditions when said second amount exceeds a given value.

5. The automatic monitor of claim 2, in which said actuating means is ineffective to actuate said device to inoperative position when said second amount exceeds a given value.

6. The automatic monitor of claim 3, in which said actuating means is ineffective to actuate said device to inoperative position when said direct current in said line exceeds said predetermined range of values.

7. The automatic monitor of claim 4, in which said actuating means is ineffective to actuate said device to inoperative position when the current in said line is below a given value.

8. An automatic monitor for a communication line having primary and secondary answering stations, the operative connection of said stations to said line resulting in a change in the electrical condition of said line at said primary answering station, said monitor comprising an intelligence device connected to said line and actuatable between operative and inoperative conditions, and actuating means operatively connected between said line and said device, sensitive to the electrical condition of said line, effective to render said device operative in response to the change in the electrical condition of said line at said primary station attendant upon the operative connection of said secondary station alone to said line, and effective to render said device inoperative in response to the change in the electrical condition of said line at said primary station attendant upon the operative connection of said primary station to said line.

9. An automatic monitor for a communication line having primary and secondary answering stations, the operative connection of said stations to said line resulting in a change in the electrical condition of said line at said primary answering station, said monitor comprising an intelligence device connected to said line and actuatable between operative and inoperative conditions, and actuating means operatively connected between said line and said device, sensitive to the electrical condition of said line, effective to render said device operative in response to the change in electrical condition of said line at said primary station attendant upon the operative connection of said secondary station alone to said line, and effective to render said device inoperative in response to the change in the electrical condition of said line at said primary station attendant upon the operative connection of said primary station to said line together with the operative disconnection of said secondary station from said line.

10. An automatic monitor for a communication line having primary and secondary answering stations, the operative connection of said stations to said line resulting in a change in the voltage of said line at said primary answering station, said monitor comprising an intelligence device connected to said line and actuatable between operative and inoperative conditions, and actuating means operatively connected between said line and said device, sensitive to the voltage of said line, effective to render said device operative in response to the change in voltage of said line at said primary station attendant upon the operative connection of said secondary station alone to said line, and effective to render said device inoperative in response to the change in the voltage of said line at said primary station attendant upon the operative connection of said primary station to said line.

11. An automatic monitor for a communication line having primary and secondary answering stations, the operative connection of said stations to said line resulting in a change in the voltage of said line at said primary answering station, said monitor comprising an intelligence device connected to said line and actuatable between operative and inoperative conditions, and actuating means operatively connected between said line and said device, sensitive to the voltage of said line, effective to render said device operative in response to the change in the voltage of said line at said primary station attendant upon the operative connection of said secondary station alone to said line, and effective to render said device inoperative in response to the change in the voltage of said line at said primary station attendant upon the operative connection of said primary station to said line, and effective to render said device inoperative in response to the change in the voltage of said line at said primary station attendant upon the operative connection of said primary station to said line together with the operative disconnection of said secondary station from said line.

12. An automatic monitor for a communication line having primary and secondary answering stations, the operative connection of said stations to said line resulting in a change in the voltage and current of said line at said primary answering station, said monitor comprising an intelligence device connected to said line and actuatable between operative and inoperative conditions, and actuating means operatively connected between said line and said device, sensitive to the voltage and current of said line, effective to render said device operative in response to the change in the voltage of said line at said primary station attendant upon the operative connection of said secondary station to said line, and effective to render said device inoperative in response to the change in the current of said line at said primary station attendant upon the operative connection of said primary station to said line.

13. An automatic monitor for a communication line having primary and secondary answering stations, the operative connection of said stations to said line resulting in a change in the voltage and current of said line at said primary answering station, said monitor comprising an intelligence device connected to said line and actuatable between operative and inoperative conditions, and actuating means operatively connected between said line and said device, sensitive to the voltage and current of said line, effective to render said device operative in response to the change in the voltage of said line at said primary station attendant upon the operative connection of said secondary station to said line, and effective to render said device inoperative in response to the change in the current of said line at said primary station attendant upon the operative connection of said primary station to said line together with the operative disconnection of said secondary station from said line.

14. In combination with a communication line having primary and secondary answering stations, a transducing device connected to said line, a first relay operatively connected to said line and adapted to be actuated when the voltage of said line drops below a predetermined value, a second relay operatively connected to said line, means sensitive to the condition of said line when said primary answering station is on the line and adapted to actuate said second relay in accordance with said line condition, control means for rendering said transducing device operative and inoperative, and an operative connection between said control means and said relays effective to cause said transducing device to be inoperative when said first relay is unactuated, operative when said first relay is actuated and said second relay is unactuated, and inoperative when said second relay is actuated.

15. In combination with a communication line having primary and secondary answering stations, a transducing device connected to said line, a first relay operatively connected to said line and adapted to be actuated when the voltage of said line drops below a predetermined value, a second relay operatively connected to said line, means sensitive to the condition of said line when said primary answering station is on the line and the said secondary answering station is simultaneously off the line and adapted to actuate said second relay in accordance with said line condition, control means for rendering said transducing device operative and inoperative, and an operative connection between said control means and said relays effective to cause said transducing device to be inoperative when said first relay is unactuated, operative when said first relay is actuated and said second relay is unactuated, and inoperative when said second relay is actuated.

16. In the combination of claim 14, a third relay sensitive to the presence on the line of noise and adapted to be actuated thereby, and an operative connection between said third relay and said control means effective to render said transducer inoperative whenever said third relay is actuated.

17. The combination of claim 14, in which said first relay has an actuating coil connected across said line in series with a bucking voltage source the value of which is greater than the voltage of said line when said second answering station is on the line.

18. The combination of claim 17, in which the actuated contacts of said first relay are normally open, and in which said means for actuating said second relay comprises an actuating coil connected across said line in series with said normally open contacts of said first relay and in series with a bucking voltage source the value of which is of the same order of magnitude as the voltage across said line when said primary answering station is on the line.

19. The combination of claim 17, in which the actuated contacts of said first relay are normally open, and in which said means for actuating said second relay comprises an actuating coil connected across said line in series with said normally open contacts of said first relay and in series with a bucking voltage source the value of which is of the same order of magnitude as the voltage across said line when said primary answering station is on the line, and a resistor selectively operatively connectable with the actuating coil of said second relay so as to vary the sensitivity thereof, thereby to make said second relay selectively sensitive to the presence on the line of (*a*) said primary and secondary stations simultaneously and (*b*) said primary station alone.

20. The combination of claim 17, in which said means for actuating said second relay comprises an actuating coil connected to said line so as to be sensitive to the current in said line, the actuated contacts of said second relay being normally closed and being in series with the actuating coil of said first relay.

21. The combination of claim 17, in which said means for actuating said second relay comprises an actuating coil connected to said line so as to be sensitive to the current in said line, the actuated contacts of said second relay being normally closed and being in series with the actuating coil of said first relay, and a resistor selectively operatively connectable with the actuating coil of said second relay so as to vary the sensitivity thereof, thereby to make said second relay selectively sensitive to the presence on the line of (*a*) said primary and secondary answering stations simultaneously and (*b*) said primary station alone.

22. In combination with a communication line having primary and secondary answering stations, a transducing device connected to said line, a relay operatively connected to said line, means sensitive to the electrical condition of said line and adapted to actuate said relay in one way by a sensed line condition corresponding to the disconnection of both primary and secondary answering stations from said line, in a different way by a sensed line condition corresponding to the connection of said secondary answering station to said line while said primary answering station is disconnected from said line, and in said one way by a sensed line condition corresponding to the connection of said primary answering station to said line independently of the connection or disconnection of said secondary answering station relative to said line, and means operatively connecting said relay and said device and effective to render said device operative or inoperative corresponding to the way in which said relay is actuated.

23. In combination with a communication line having primary and secondary answering stations, a transducing device connected to said line, a relay operatively connected to said line, means sensitive to the electrical condition of said line and adapted to actuate said relay in one way by a sensed line condition corresponding to the disconnection of both primary and secondary answering stations from said line, in a different way by a sensed line condition corresponding to the connection of said secondary answering station to said line while said primary answering station is disconnected from said line, and in said one way by a sensed line condition corresponding to the connection of said primary answering station to said line together with the disconnection of said secondary answering station from said line, and means operatively connecting said relay and said device and effective to render said device operative or inoperative corresponding to the way in which said relay is actuated.

24. The combination of claim 23, in which said means for actuating said relay comprises an actuating coil connected across said line in series with a voltage source the value of which corresponds to the voltage of said line when said secondary answering station is connected thereto and said primary answering station is simultaneously disconnected therefrom.

25. The combination of claim 23, in which said means for actuating said relay comprises an actuating coil connected in series with a first voltage source the value of which corresponds to the voltage of said line when said secondary answering station is connected thereto simultaneously with the disconnection of said primary answering station therefrom, and another relay the actuating coil of which is connected across said line in series with another voltage source the value of which corresponds to the voltage of said line when neither said primary nor said secondary answering stations are on the line, the contacts of said other relay being connected to said line, to said other voltage source, and to the actuating coil of said first mentioned relay, said other relay being effective to selectively connect said actuating coil of said first relay to said other voltage source or across said line, in accordance with the voltage of said line when compared with said other voltage source.

References Cited in the file of this patent

UNITED STATES PATENTS 2,228,673 Reeves ---------------- Jan. 14, 1941

2,826,636 Beatty ---------------- Mar. 11, 1958